W. E. PRALL.
Improvement in Steam-Vacuum Pumps.
No. 5,123. Reissued Oct. 29, 1872.
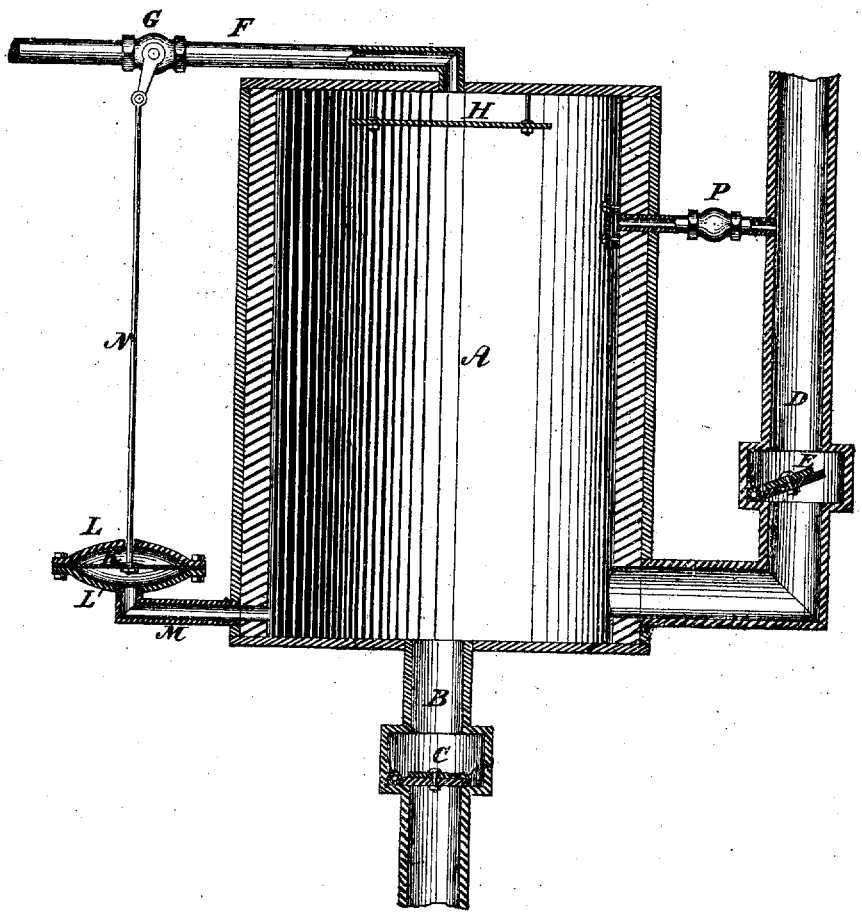
Witnesses.
J. Lowndes Bell.
Wm. H. Rowe,
Inventor.
William E. Prall
Inventor
By David A. Burr
Atty.
AM. PHOTO-LITHOGRAPHIC CO. N.Y. (OSBORNE'S PROCESS.)

UNITED STATES PATENT OFFICE.

WILLIAM EDGAR PRALL, OF WASHINGTON, DISTRICT OF COLUMBIA.

IMPROVEMENT IN STEAM VACUUM-PUMPS.

Specification forming part of Letters Patent No. 116,751, dated July 4, 1871; reissue No. 5,123, dated October 29, 1872.

*To all whom it may concern:*

Be it known that I, WILLIAM EDGAR PRALL, of the city of Washington, in the District of Columbia, have invented certain Improvements in Automatic Steam Vacuum-Pumps; of which the following is a specification:

My invention relates to that class of steam-pumps or water-elevating engines in which the water is drawn into the machine by means of a condensation of steam therein and expelled by an admission of steam thereto. It consists in combining with a chamber or cylinder of the pump or engine, and with the cut-off valve of its steam-induction pipe, a yielding partition, arranged to play between the interior and exterior of said chamber so as to be moved intermittently in opposite directions by the alternate production and reduction of pressure produced within said chamber by an admission of water thereto and a condensation of steam therein, and so connected with said cut-off valve as that the variations or differences of pressure alternately produced within the chamber as described, operating to cause a movement of the partition alternately in opposite directions, shall by such movement close the cut-off valve when there is a reduction of pressure in the chamber and throw the same open when the pressure is renewed; the object of my invention being to produce an effective automatic movement of the steam-induction valve to open and close the same positively by means of the operative forces resulting from variations of pressure produced in the engine by the condensation of steam therein and the admission of water thereto. The yielding partition may consist of a diaphragm so secured as to permit a movement of some portion thereof, or it may consist of a piston or plate moving bodily.

The accompanying drawing represents, in section, a simple vacuum-pump fitted with my invention.

In said drawing, A is the cylinder or chamber of the pump; B, its induction or suction pipe, fitted with a check-valve, C, of any approved form; and D, its discharge-pipe, also provided with a suitable check-valve, E. F is a pipe from the steam-boiler, communicating with the upper end of the cylinder A and provided with a suitable cut-off valve, G. H is a deflecting-plate, secured within the cylinder A opposite the mouth of the steam-pipe F to deflect and distribute the current of steam entering the cylinder. K is a yielding partition, consisting of a flexible diaphragm confined at its edges between an upper and lower plate, L and L′, which form a casing therefor, said plates being concaved or hollowed out on their inner sides sufficiently to permit the center of the diaphragm to move between them at right angles to its plane to an extent proportioned to the amount of play required to open and close the cut-off valve G. M is a small open pipe, connecting the space or compartment on the inner side of the diaphragm with the interior of the cylinder A, so that said space becomes virtually a part of the interior of said cylinder, and the diaphragm is thus made to intervene between the interior and exterior thereof. N is a rod, secured centrally to the diaphragm K, and which extends thence outwardly to the steam cut-off valve G, the connection being so made and adjusted as that when the diaphragm is forced outwardly by a pressure from within the cylinder the valve shall be thrown open, and when the diaphragm is drawn or pressed inward under the influence of a reduction of pressure produced within the cylinder the valve shall be closed. P is a small pipe connecting with the discharge-pipe D, opening into the upper part of the cylinder A, and fitted with a valve to prevent an escape of steam through it from the cylinder. This pipe serves to deliver an injection of cold water from the discharge-pipe to complete the condensation of steam in the cylinder so soon as its pressure has been reduced below that of the column of water in said discharge-pipe.

In the operation of this improved steam-vacuum pump, the cylinder A being filled with water, the pressure of the water communicated through the pipe M to the diaphragm K will force the center of said diaphragm outward, and thus, by means of the connecting-rod N, throw open the valve G, so that whenever the stop-valve in the steam-pipe F is opened the steam may pass freely into the cylinder A to bear upon the water and expel it therefrom. So soon, however, as the water is expelled or nearly expelled from the cylinder and a partial condensation of steam is produced, either by its contact with the surface of the bottom of the cylinder and of the discharge-pipe and its check-valve, or by any of the means or expedients for the purposes which are or may be used in the operation of this class of water-elevating engines, so as to reduce the pressure upon the inner side of the diaphragm below that upon its opposite side, the diaphragm will be forced inward, and thus, by means of the connecting-rod N, close the cut-off valve G and cut off all further admission of steam to the cylinder. So soon as the cylinder has again filled with water by means of the complete condensation of steam therein the diaphragm will again move to open the valve G, and the operation of the machine will thus be repeated.

The flexible diaphragm K is so arranged as that it will bear closely against the inner surface of the plates between which it is fastened so soon as its movement in either direction is completed, and it is thereby effectually protected against any strain or undue pressure thereon, which might otherwise injure it.

It is manifest that, in the method herein described of operating a cut-off valve in a water-elevating engine, a piston or partition yielding bodily may be substituted as an equivalent for a flexible diaphragm or partition yielding in part only, for a piston having its sides inclosed by a suitable casing and its ends or opposite faces arranged to receive the pressure communicated as herein set forth to the opposite sides or faces of the flexible diaphragm K from within and from without the chamber or cylinder A of the apparatus will, under the influence of the same forces and through the intervention of similar devices, operate in the same manner as said diaphragm to move the steam-valve G, and I contemplate the use of such a piston as an equivalent for the diaphragm for the purpose of receiving and communicating to the steam-valve the operating forces resulting from variations of pressure in the engine, as described.

I do not claim as new the use of a float or yielding partition so placed wholly within a chamber of a steam water-elevator as that its opposite sides shall both be exposed to the forces exerted within said chamber, it being an essential feature of my invention that the partition shall divide, to a greater or less extent, at a point proximate or remote from the main portion thereof, the interior of the chamber with which it is connected from the exterior thereof.

I claim as my invention—

1. The method, substantially as herein described, of operating intermittently a steam cut-off valve in a steam water-elevating apparatus by means of a movable diaphragm or its equivalent acted on by a condensation of steam and admission of water within said apparatus.

2. In combination with a chamber or cylinder of a steam water-elevating apparatus, and with the cut-off valve governing its steam induction-pipe, a yielding partition having its opposite sides exposed, respectively, to the influences of forces operating upon one side or face thereof from within and upon the other side or face thereof from without said chamber, and so connected with said cut-off valve as that the variations or differences of pressure produced within the chamber by a condensation of steam therein and an admission of water thereto will cause a movement of the partition alternately in opposite directions, such movement positively closing the cut-off valve when there is a reduction of pressure in the chamber and promptly throwing the same open when the pressure in said chamber is renewed, substantially as and for the purpose herein set forth.

WILLIAM EDGAR PRALL.

Witnesses:
WM. H. ROWE,
J. SNOWDEN BELL.